US010077808B2

(12) United States Patent
Cowles, Jr. et al.

(10) Patent No.: US 10,077,808 B2
(45) Date of Patent: *Sep. 18, 2018

(54) ROLLER PROFILE FOR HOURGLASS ROLLER BEARINGS IN AIRCRAFT

(71) Applicant: Roller Bearing Company of America, Inc., Oxford, CT (US)

(72) Inventors: John H. Cowles, Jr., Unionville, CT (US); Alex Habibvand, Orange, CA (US); Richard Murphy, Torrington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 652 days.

This patent is subject to a terminal disclaimer.

(21) Appl. No.: 14/572,260

(22) Filed: Dec. 16, 2014

(65) Prior Publication Data
US 2016/0327091 A1    Nov. 10, 2016

Related U.S. Application Data

(60) Provisional application No. 61/917,905, filed on Dec. 18, 2013, provisional application No. 62/007,208, filed on Jun. 3, 2014.

(51) Int. Cl.
*F16C 33/36* (2006.01)
*B64C 9/16* (2006.01)
(Continued)

(52) U.S. Cl.
CPC .............. *F16C 33/36* (2013.01); *B64C 9/16* (2013.01); *B64C 9/18* (2013.01); *B64C 13/28* (2013.01);
(Continued)

(58) Field of Classification Search
CPC ........ F16C 33/36; F16C 33/784; F16C 33/48; B64C 9/22
(Continued)

(56) References Cited

U.S. PATENT DOCUMENTS 1,199,404 A   9/1916 Miller
1,376,310 A   4/1921 Armstrong
(Continued)

FOREIGN PATENT DOCUMENTS

CN   100436851 C   11/2008
DE   2800854 A1    7/1978
(Continued)

OTHER PUBLICATIONS

Extended European Search Report for European Patent Application No. 15170493.9-1760 / 2952760, dated Jan. 4, 2016.
(Continued)

*Primary Examiner* — Brian M O'Hara
*Assistant Examiner* — Keith L Dixon
(74) *Attorney, Agent, or Firm* — Murtha Cullina LLP

(57) ABSTRACT

An edge flap arrangement for an aircraft wing includes a main flap element and an actuator for moving the main flap element relative to the aircraft wing. A linkage arrangement supports the main flap element and includes a drop hinge link arrangement having a fixed strut secured to the aircraft wing and a drop link secured to the main flap element. The fixed strut and the drop link are connected by a hinge point having an hourglass bearing assembly having hourglass shaped rollers with a circular cross section symmetrical about a longitudinal axis, first and second axial ends, and an exterior surface. The exterior surface defines a concave engagement surface having a first radius of curvature R1 and a second radius of curvature which is greater than the first
(Continued)

radius of curvature R1. The first radius of curvature is between 50 and 95 percent of the second radius of curvature.

8 Claims, 17 Drawing Sheets

(51) Int. Cl.
  F16C 23/08 (2006.01)
  B64C 9/18 (2006.01)
  B64C 13/28 (2006.01)
  F16C 19/38 (2006.01)
  F16C 11/06 (2006.01)
(52) U.S. Cl.
  CPC ............ F16C 19/38 (2013.01); F16C 23/086 (2013.01); F16C 23/088 (2013.01); F16C 11/06 (2013.01); F16C 2240/70 (2013.01); F16C 2326/43 (2013.01)
(58) Field of Classification Search
  USPC .......................................... 384/568; 244/214
  See application file for complete search history.

(56) References Cited

U.S. PATENT DOCUMENTS

| | | | |
|---|---|---|---|
| 1,901,967 | A | 3/1933 | Hoover |
| 2,387,962 | A | 10/1945 | Williams |
| 2,678,246 | A | 5/1954 | Potter |
| 2,764,432 | A | 9/1956 | Leister et al. |
| 2,767,037 | A | 10/1956 | Williams |
| 3,594,851 | A | 7/1971 | Swatton |
| 4,049,219 | A | 9/1977 | Dean et al. |
| 4,557,613 | A | 12/1985 | Tallian et al. |
| 4,714,358 | A | 12/1987 | Bayer et al. |
| 4,929,098 | A | 5/1990 | Takata et al. |
| 5,310,269 | A | 5/1994 | Wardle et al. |
| 5,441,351 | A * | 8/1995 | Grunze ................ F16C 23/086 384/450 |
| 5,586,826 | A | 12/1996 | Kellstrom et al. |
| 5,667,312 | A | 9/1997 | Grunze et al. |
| 6,315,458 | B1 * | 11/2001 | Unno ...................... F16C 19/26 384/565 |
| 6,390,685 | B1 | 5/2002 | Shimomura et al. |
| 6,394,656 | B1 | 5/2002 | Williams |
| 7,959,678 | B2 | 6/2011 | Filippi et al. |
| 8,025,257 | B2 | 9/2011 | Gyuricsko et al. |
| 8,070,106 | B2 | 12/2011 | Engelbrecht et al. |
| 8,534,612 | B2 | 9/2013 | Morris |
| 8,567,727 | B2 | 10/2013 | Morris |
| 8,714,493 | B2 | 5/2014 | Morris |
| 8,753,457 | B2 | 6/2014 | Moyer |
| 9,561,845 | B2 * | 2/2017 | Habibvand ............... B64C 9/16 |
| 2005/0069239 | A1 | 3/2005 | Yamamoto et al. |
| 2006/0115193 | A1 | 6/2006 | Begin |
| 2008/0040886 | A1 | 2/2008 | Arnold et al. |
| 2008/0219834 | A1 | 9/2008 | Merfeld et al. |
| 2009/0169145 | A1 | 7/2009 | Obayashi et al. |
| 2010/0027933 | A1 | 2/2010 | Locke et al. |
| 2010/0033965 | A1 | 2/2010 | Casey et al. |
| 2010/0150486 | A1 | 6/2010 | Kuppuraju et al. |
| 2010/0215303 | A1 | 8/2010 | Shaikh |
| 2011/0064348 | A1 | 3/2011 | Jacob et al. |
| 2011/0086754 | A1 | 4/2011 | Gentleman et al. |
| 2011/0127386 | A1 | 6/2011 | Morris |
| 2011/0182539 | A1 | 7/2011 | Kolar |
| 2011/0220762 | A1 | 9/2011 | Gyuricsko et al. |
| 2011/0274382 | A1 * | 11/2011 | Berns ..................... F16C 9/04 384/565 |
| 2011/0293212 | A1 | 12/2011 | Kobayashi |
| 2011/0317952 | A1 | 12/2011 | Heaton et al. |
| 2012/0082409 | A1 | 4/2012 | Miyachi |
| 2012/0263405 | A1 | 10/2012 | Mizuki et al. |
| 2012/0291625 | A1 | 11/2012 | Habibvand |
| 2013/0087662 | A1 | 4/2013 | Soenarjo |
| 2013/0108200 | A1 | 5/2013 | Berns |
| 2013/0112814 | A1 | 5/2013 | Yue |
| 2013/0142471 | A1 | 6/2013 | Muller et al. |
| 2014/0193112 | A1 | 7/2014 | Caspall |
| 2014/0301680 | A1 | 10/2014 | Tecza et al. |
| 2014/0301689 | A1 | 10/2014 | Honjo |
| 2014/0334761 | A1 | 11/2014 | Hewitt et al. |
| 2014/0339369 | A1 | 11/2014 | Habibvand |
| 2014/0345141 | A1 | 11/2014 | Gonzalez et al. |
| 2014/0369634 | A1 | 12/2014 | Kane |
| 2015/0078699 | A1 | 3/2015 | Gessendorfer et al. |

FOREIGN PATENT DOCUMENTS

| | | |
|---|---|---|
| DE | 19612571 A1 | 10/1997 |
| DE | 102006050940 A1 | 4/2008 |
| DE | 102009042941 A1 | 3/2011 |
| EP | 0189365 A1 | 7/1986 |
| EP | 0649990 A1 | 4/1995 |
| EP | 1315914 B1 | 6/2003 |
| EP | 2354579 A1 | 8/2011 |
| EP | 2067696 B1 | 8/2013 |
| EP | 2589829 A1 | 8/2013 |
| GB | 2237336 A | 1/1991 |
| GB | 2237336 A | 5/1991 |
| GB | 2428996 A | 2/2001 |
| GB | 2428996 A | 2/2007 |
| JP | 2006071091 A | 3/2006 |
| JP | 2006266277 A | 5/2006 |
| JP | 2008286330 A | 11/2008 |
| JP | 2012017770 A | 1/2012 |
| JP | 2012202453 A | 10/2012 |
| JP | 2013145012 A | 7/2013 |
| JP | 2014018825 A | 2/2014 |
| WO | 2001025647 A1 | 4/2001 |
| WO | 2007074691 A1 | 7/2007 |
| WO | 2007125001 A2 | 11/2007 |
| WO | 2011140230 A1 | 11/2011 |
| WO | 2012129223 A1 | 9/2012 |
| WO | 2013122526 A1 | 8/2013 |
| WO | 2013129645 A1 | 9/2013 |
| WO | 2014021958 A1 | 2/2014 |
| WO | 2014182569 A2 | 11/2014 |
| WO | 2015031247 A2 | 3/2015 |

OTHER PUBLICATIONS

Extended Search Report for EP15170500.1-1751, dated Nov. 5, 2015.
Extended European Search Report for European Application No. 14198599.4-1751/ 2894359, dated Jun. 17, 2015.
Office Communication issued in corresponding European Application No. 14198599.4, dated May 11, 2016, pp. 1-5.
Extended European Search Report for EP Patent Application No. 15170498.8-176012957781, dated Feb. 5, 2016.

* cited by examiner

ROLLER PROFILE FOR HOURGLASS ROLLER BEARINGS IN AIRCRAFT

CROSS-REFERENCE TO RELATED APPLICATION(S)

This application claims the benefit of U.S. Provisional Application Nos. 62/007,208, filed Jun. 3, 2014, and 61/917,905, filed Dec. 18, 2013, which are incorporated by reference as if disclosed herein in their entirety.

FIELD OF THE INVENTION

This invention relates to roller profiles for hourglass roller bearings and more specifically to a roller profile having a two or more different radiuses of curvature. More particularly, the present invention relates to roller profiles for hourglass roller bearings for use in aircraft, in particular, in a drop linkage assembly of a trailing edge flap arrangement of such aircraft.

BACKGROUND

Referring to FIG. 1, typical hourglass roller bearings 500, include an inner member 510, for example a ball, surrounded by an outer member 512. A plurality of hourglass shaped rollers 515 are disposed between the inner member 510 and the outer member 512. The inner member 510 defines a radially outwardly facing convex bearing surface 520. The outer member 512 defines a first radially inwardly facing convex bearing surface 522A and a second radially inwardly facing convex bearing surface 522B. Each of the rollers 515 has a concave exterior surface 525 extending between axial end faces 525A and 525B of the roller 515.

When bearings are operated at high loads, the typical rollers 515 can experience a detrimental effect referred to as "end-stress." As shown in FIG. 2, each of the rollers 515 has an effective length LE that extends between axially outermost portions of two high stress zones 535A and 535B. The concave exterior surface 525 of the typical hourglass roller 515 has a constant radius of curvature RC over the entire effective length LE. As shown in FIG. 3, typically the peak surface stress 550P occurs in the high stress zones 535A and 535B. The peak surface stress 550P causes accelerated wear of: 1) the radially outwardly facing convex bearing surface 520; 2) the first radially inwardly facing convex bearing surface 522A; 3) the second radially inwardly facing convex bearing surface 522B; and 4) the concave exterior surface 525 of the roller 515.

For example, FIG. 4 illustrates the outer member 512 having a line of surface distress 555 extending circumferentially around a portion of the first radially inwardly facing convex bearing surface 522A, shown after testing (but before spalling) with a prior art hourglass shaped roller 515. FIGS. 5 and 6 illustrate the inner member 510 having lines of surface distress 555A, 555B, 555C and 555D at four locations where the high stress zones 535A and 535B of the prior art roller 515 contact the inner member 510, shown after testing (but before spalling). FIG. 7 illustrates additional wear in the form of spalling 566 on the radially outwardly facing convex bearing surface 520 of the inner member 510. FIG. 8 illustrates the prior art roller 515 having lines of burnished material 577 at an edge of the effective length LE that extends between the axially outermost portions of two high stress zones 535A and 535B.

Bearings are typically used in aircraft wing flap arrangements. For example, U.S. Pat. No. 8,714,493 describes a trailing edge flap arrangement for an aircraft wing that includes a drop linkage arrangement that includes one or more bearings. The subject matter of U.S. Pat. No. 8,714,493 is incorporated by reference herein, in its entirety.

SUMMARY OF THE INVENTION

In one aspect, the present invention resides in an edge flap arrangement for an aircraft wing. The edge flap arrangement includes a main flap element and an actuator for moving the main flap element relative to the aircraft wing. A linkage arrangement supports the main flap element and includes a drop hinge link arrangement having a fixed strut secured to the aircraft wing and a drop link secured to the main flap element. The fixed strut and the drop link are connected by a hinge point having an hourglass bearing assembly having hourglass shaped rollers with a circular cross section symmetrical about a longitudinal axis, first and second axial ends, and an exterior surface. The exterior surface defines a concave engagement surface having a first radius of curvature R1 and a second radius of curvature R2 which is greater than the first radius of curvature R1. The first radius of curvature is between 50 and 95 percent of the second radius of curvature.

In another aspect disclosed herein, there is provided an hourglass bearing assembly installed in an edge flap arrangement of an aircraft. The hourglass bearing includes an inner raceway defining a radially outwardly facing convex surface having an inner raceway radius of curvature. The hourglass bearing assembly includes an outer raceway defining a radially inward facing convex inner surface having an outer raceway radius of curvature Ro. The outer raceway is positioned around the inner raceway. The hourglass bearing assembly includes a plurality of rollers disposed between the inner raceway and the outer raceway. Each of the plurality of rollers has an hourglass shape and is in rolling engagement with the inner raceway and the outer raceway. Each of the plurality of rollers has a circular cross section symmetrical about a longitudinal axis. Each of the plurality of rollers includes a first axial end and a second axial end. An exterior surface extends between the first axial end and the second axial end. The exterior surface defines a concave engagement surface that extends outwardly from a central portion of the roller. The concave engagement surface has a first radius of curvature extending from the central portion to each of two first transition zones positioned on opposing sides of the central portion. The concave engagement surface has a second radius of curvature extending outwardly from each of the two first transition zones to each of two second transition zones. The second radius of curvature is greater than the first radius of curvature. The first radius of curvature is between 50 and 95 percent of the second radius of curvature.

These and other aspects are discussed below in more detail herein and are illustrated in the attached figures.

DETAILED DESCRIPTION OF THE INVENTION

Figure 9:
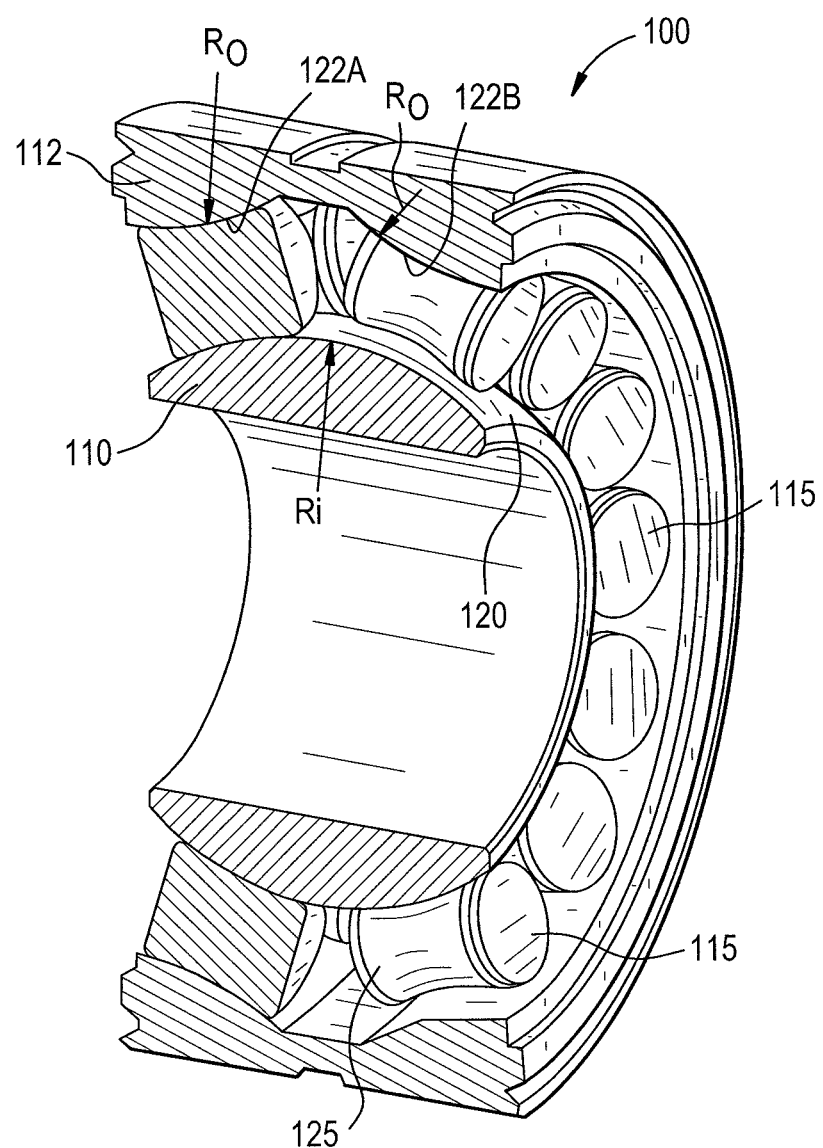
FIG. 9 is a perspective view of a cross section of an hourglass bearing having the rollers of the present invention.

As shown in FIG. 9, an hourglass bearing assembly is generally designated by the numeral 100. The hourglass bearing assembly 100 includes an inner raceway 110 defining a radially outwardly facing convex surface 120 having a radius of curvature Ri. The hourglass bearing assembly 100 includes an outer raceway 112 defining a radially inward facing convex inner surface 122A and 122B, each having an outer raceway radius of curvature Ro. The outer raceway 112 is positioned around the inner raceway 110. A plurality of rollers 115 is disposed between the inner raceway 110 and the outer raceway 112 in two rows. Each of the plurality of rollers 115 has an hourglass shape. Each of the plurality of rollers 115 in one row is in rolling engagement with the radially outwardly facing convex surface 120 of the inner raceway 110 and the radially inward facing convex inner surface 122A of the outer raceway 112. Each of the plurality of rollers 115 in a second row is in rolling engagement with the radially outwardly facing convex surface 120 of the inner raceway 110 and the radially inward facing convex inner surface 122B of the outer raceway 112. While the plurality of rollers 115 is illustrated and described as being in two rows, the present invention is not limited in this regard as a single row of the plurality of rollers 115 may be employed.

Figure 10:
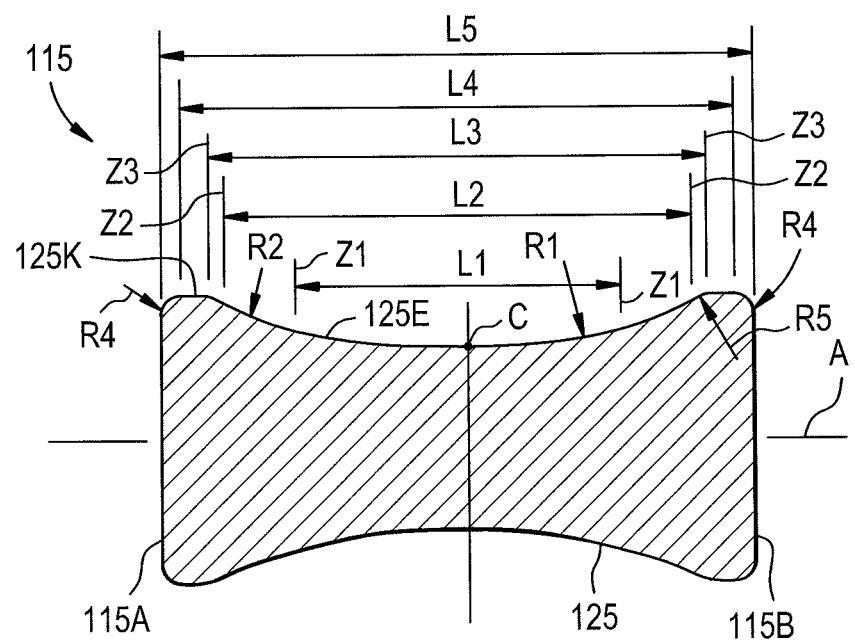
FIG. 10 is a cross sectional view of one of the rollers of the hourglass bearing of FIG. 9.
Figure 11:
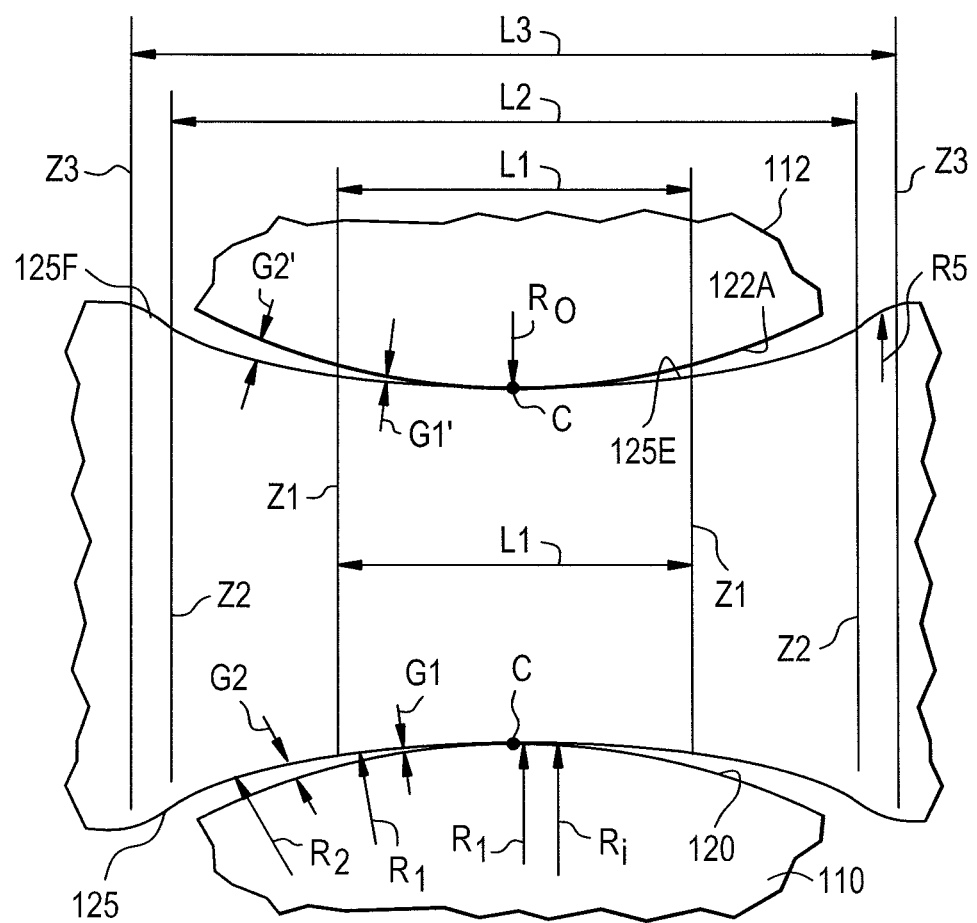
FIG. 11 is an enlarged cross sectional view of a portion of the roller of FIG. 10.

As shown in FIGS. 10 and 11, each of the plurality of rollers 115 has a circular cross section symmetrical about a longitudinal axis A. Each of the plurality of rollers 115 has a first axial end 115A and a second axial end 115B and an overall length of L5. A chamfer R4 exists at each of the first axial end 115A and second axial end 115B. Each of the plurality of rollers 115 has an exterior surface 125 extending between the first axial end 115A and the second axial end 115B. A portion 125K of the exterior surface 125 between length L4 and L3 is cylindrical. The exterior surface 125 defines a concave engagement surface 125E extending outwardly from a central portion C of the roller 115. The concave engagement surface 125E has a first radius of curvature R1 extending from the central portion C to each of two first transition zones Z1 positioned on opposing sides of the central portion C. The two first transition zones Z1 are spaced apart from one another by a distance L1. The concave engagement surface 125E has a second radius of curvature R2 extending outwardly from each of the two first transition zones Z1 to each of two second transition zones Z2. The two second transition zones Z2 are spaced part from one another by a distance L2. As shown in FIGS. 10 and 11, the second radius of curvature R2 is greater than the first radius of curvature R1. In one embodiment, the first radius of curvature R1 is between 50 percent and 95 percent of the second radius of curvature R2. In one embodiment, the first radius of curvature R1 is between 70 percent and 92 percent of the second radius of curvature R2.

As shown in FIG. 11, the radius of curvature Ri of the inner raceway 110 is between about 95 percent and 100 percent of R1. In one embodiment, the radius of curvature Ri of the inner raceway 110 is between about 98 percent and 100 percent of R1. The radius of curvature Ro of the outer raceway 112 is between about 95 percent and 100 percent of R1. In one embodiment, the radius of curvature Ro of the outer raceway 112 is between about 98 percent and 100 percent of the radius of curvature R1.

Figure 13A:
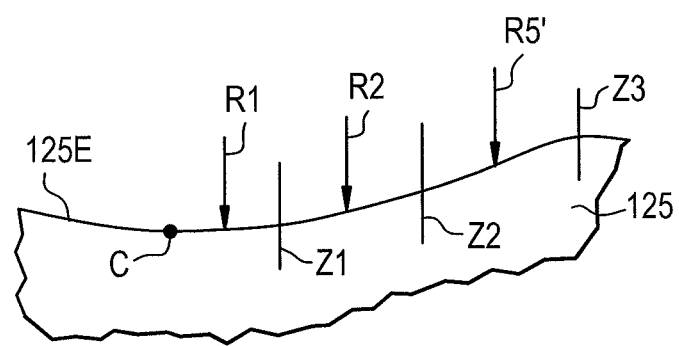
FIG. 13A is a schematic cross sectional view of a portion of the roller of FIG. 10.
Figure 13B:
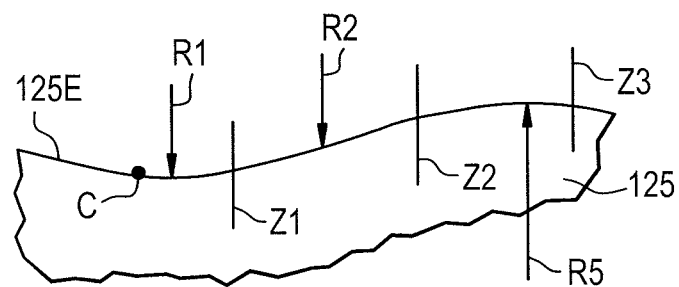
FIG. 13B is a schematic cross sectional view of a portion of one embodiment of a roller similar to that of FIG. 10.

The exterior surface 125E defines an extended area for engagement 125F positioned between each of the second transition zones Z2 and each of two third transition zones Z3. The two third transition zones Z3 are positioned outwardly from a respective one of the second transition zones Z2. The two third transitions zones Z3 are spaced apart from one another by a distance L3. In one embodiment, the first distance L1 has a magnitude between 40 percent and 60 percent of the third distance L3. In one embodiment, the first distance L1 has a magnitude between 48 percent and 51 percent of the third distance L3. The area for engagement rollingly engages a rolling surface of a bearing race (e.g., the radially outwardly facing convex surface 120 of the inner raceway 110 and the radially inward facing convex inner surfaces 122A and 122B of the outer raceway 112) when the roller 115 and bearing race are in a loaded condition. As shown in FIGS. 10 and 13B, in one embodiment, the exterior surface 125E transitions to a convex surface having a radius of curvature R5 positioned outwardly of the transition zone Z2. As shown in FIG. 13A, in one embodiment, the exterior surface transitions to a concave surface having a radius of curvature R5' positioned outwardly of the transition zones Z2, and wherein the radius of curvature R5' is greater than R2. There exists a smooth transition at the first transition zones Z1, at the second transition zones Z2 and the third transition zones Z3.

As shown in FIG. 11, there is a gap G1 defined between the exterior surface of the rollers 115 and the radially outwardly facing convex surface 120 of the inner raceway 110. Another gap G1' is defined between the exterior surface of the rollers 115 and the radially inward facing convex inner surfaces 122A and 122B of the outer raceway 112. The gaps G1 and G1' are presented between the two first transition zones Z1 wherein the radius of curvature of the exterior surface is R1. The magnitude of the gaps G1 and G1' increase at a first rate from the central portion C, where the gaps G1 and G1' are zero, to the first transition zone Z1, since the R1 is greater than Ri and Ro, as discussed herein.

In addition, there is another gap G2 defined between the exterior surface of the rollers 115 and the radially outwardly facing convex surface 120 of the inner raceway 110. Another gap G2' is defined between the exterior surface of the rollers 115 and the radially inward facing convex inner surfaces 122A and 122B of the outer raceway 112. The gaps G2 and G2' are presented axially outward of the two first transition zones Z1 and axially inward of the two third transitions zones Z3. The magnitude of the gaps G2 and G2' increase at a second rate from the first transition zone Z1 to the second transition zone Z2, since the R2 is greater than R1 and R1 is greater than Ri and Ro, as discussed herein. The second rate of increase of the gaps G2 and G2' is greater than the first rate of increase of the gaps G1 and G1'.

As the rollers 115 are loaded there are elastic deformations of: 1) the exterior surface 125E of the rollers 115; 2) the radially outwardly facing convex surface 120 of the inner raceway 110; and 3) the radially inward facing convex inner surfaces 122A and 122B of the outer raceway 112. Thus, as the rollers 115 are loaded, the gaps G1, G1', G2 and G2' decrease to comport with the elastic deformations.

Figure 1:
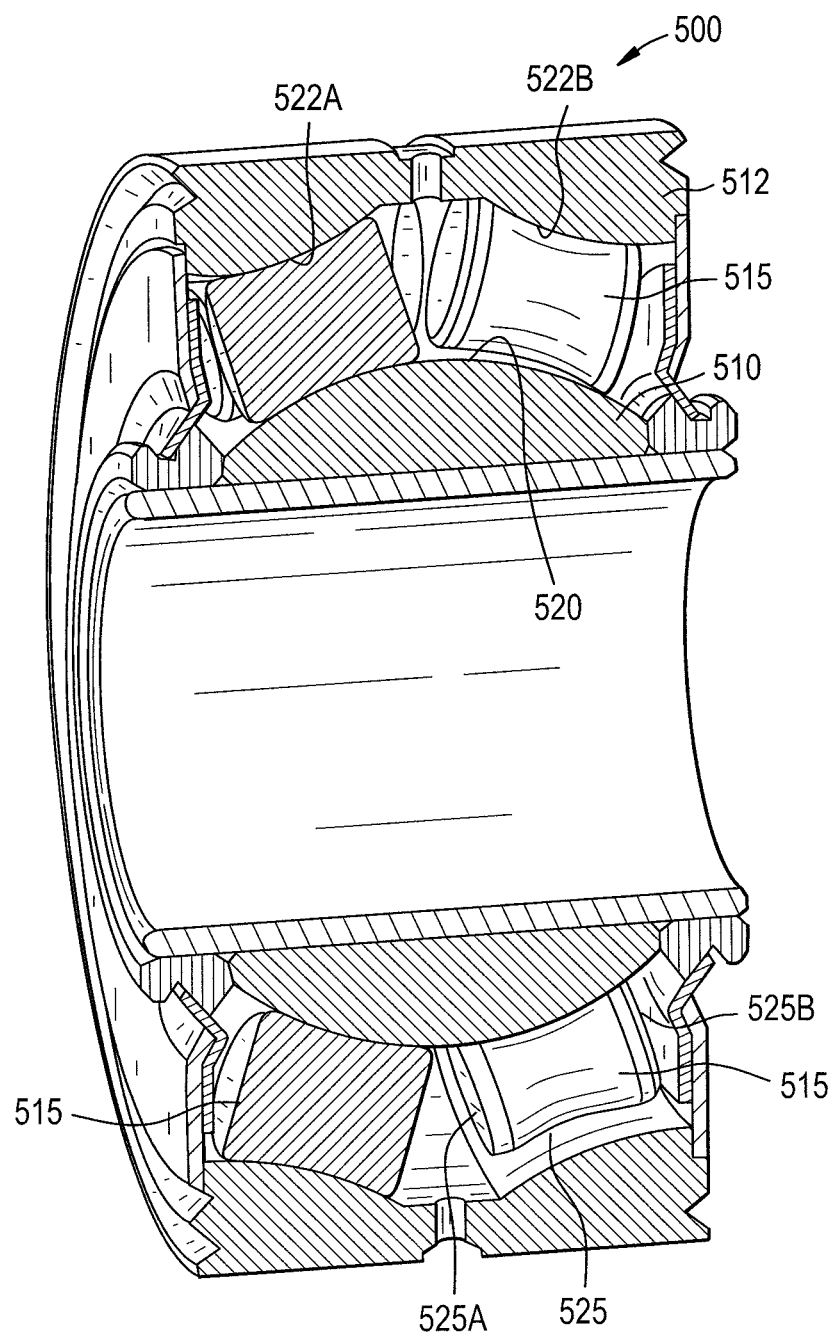
FIG. 1 is a perspective view of a cross section of a prior art hourglass bearing.
Figure 2:
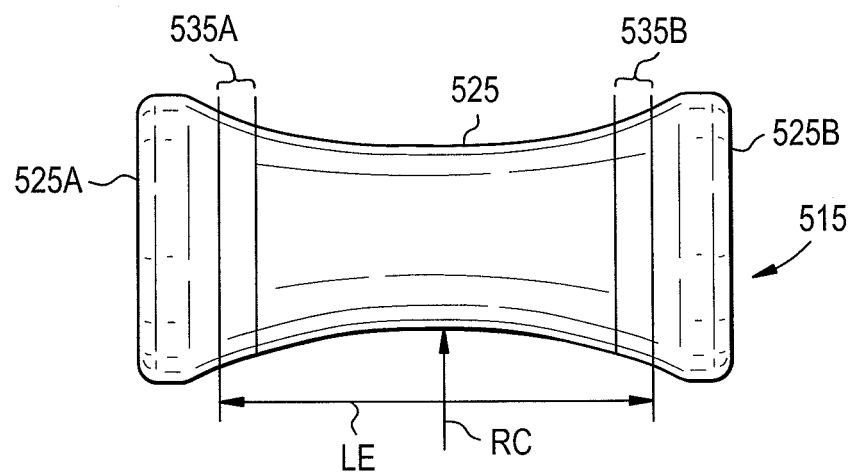
FIG. 2. is a front view of a prior art hourglass shaped roller.
Figure 3:
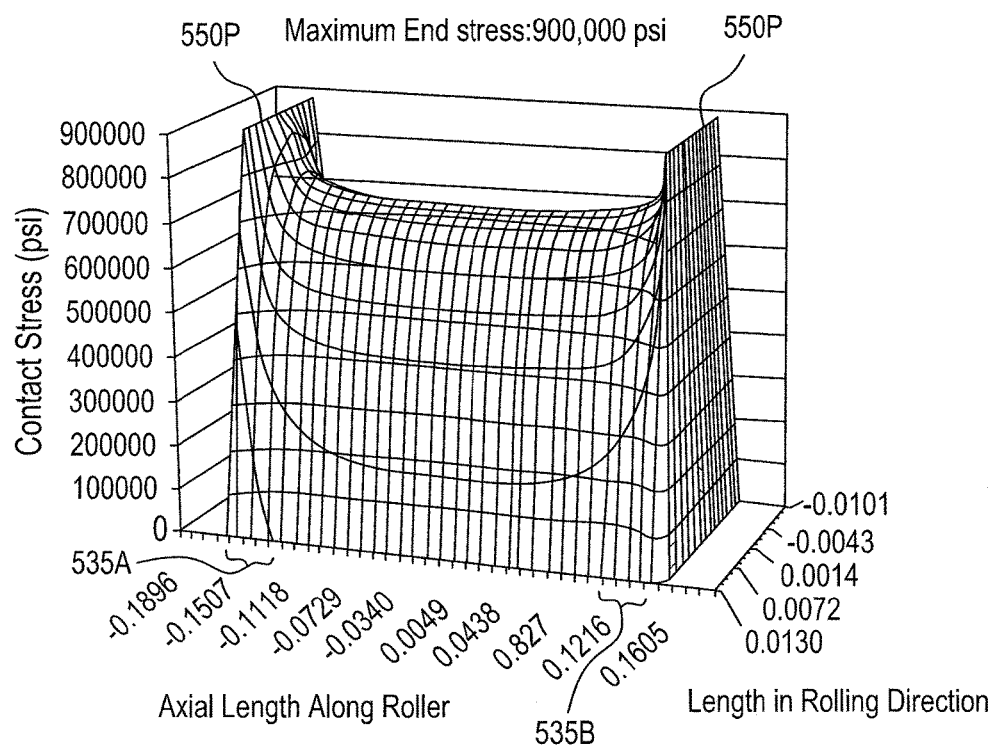
FIG. 3 is a three dimensional plot of surface stress versus axial length and circumferential length of a prior art hourglass shaped roller.
Figure 4:
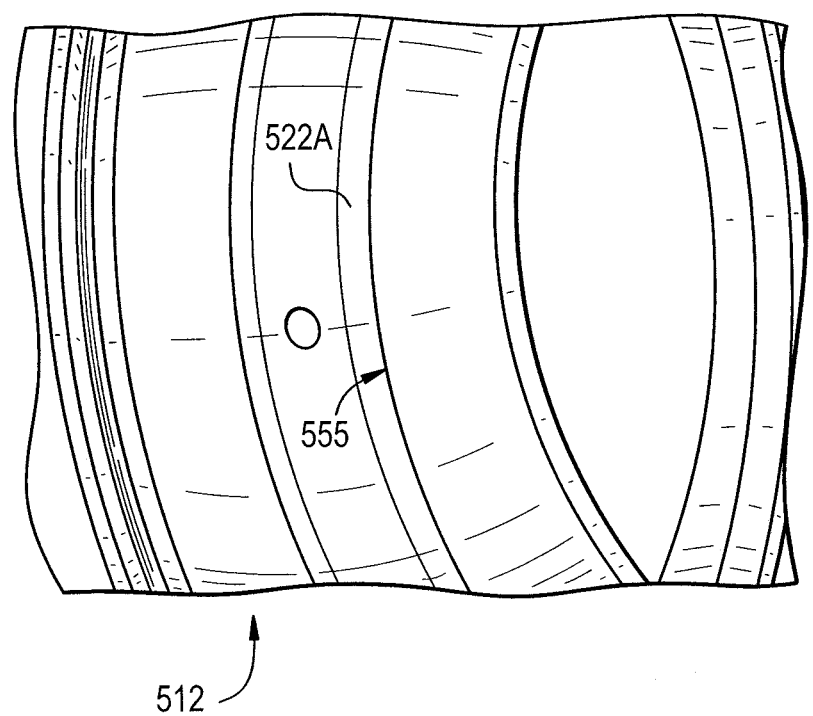
FIG. 4 is a photograph of an outer member after testing with a prior art hourglass shaped roller.
Figure 5:
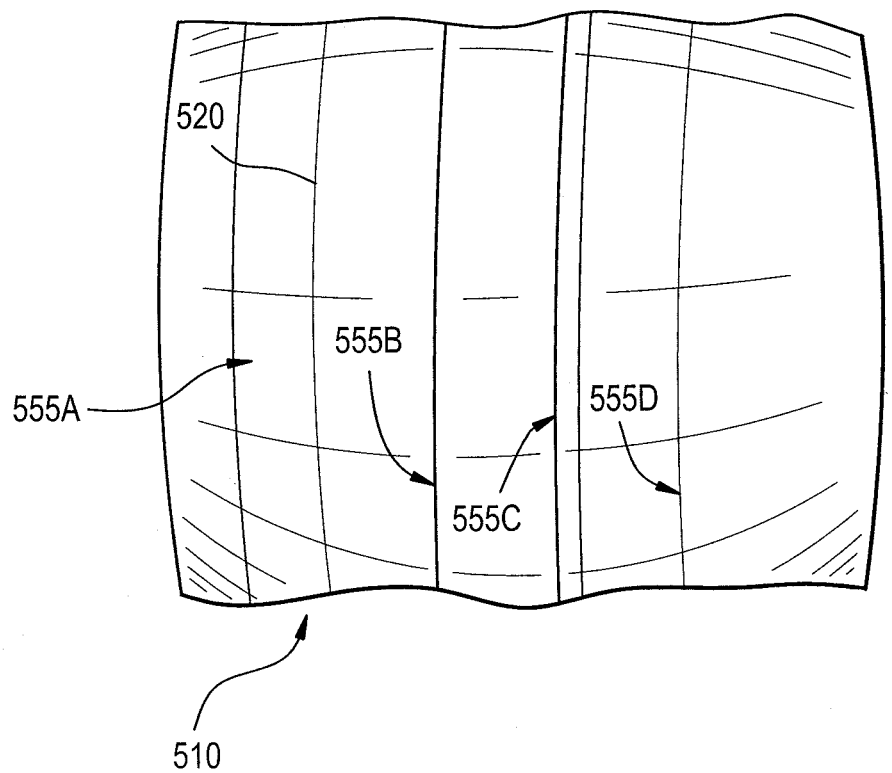
FIG. 5 is a photograph of an inner member after testing with a prior art hourglass shaped roller.
Figure 6:
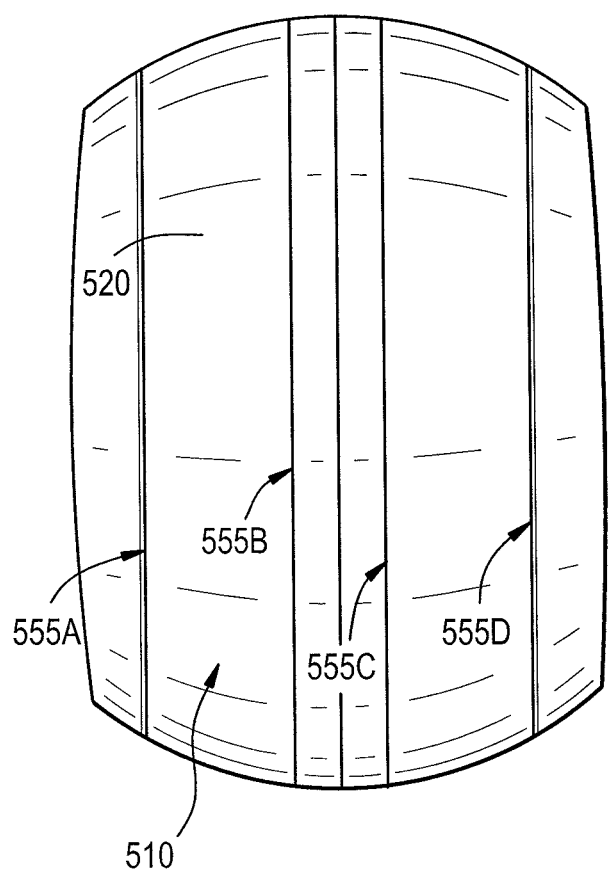
FIG. 6 is a photograph of an inner member after testing with a prior art hourglass shaped roller.
Figure 7:
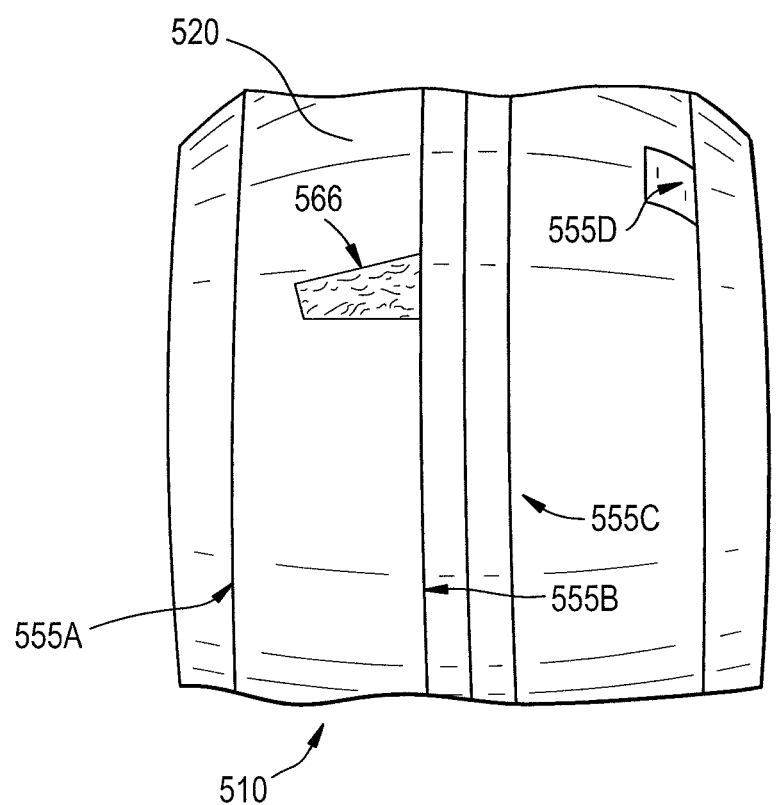
FIG. 7 is a photograph of an inner member after testing with a prior art hourglass shaped roller.
Figure 8:
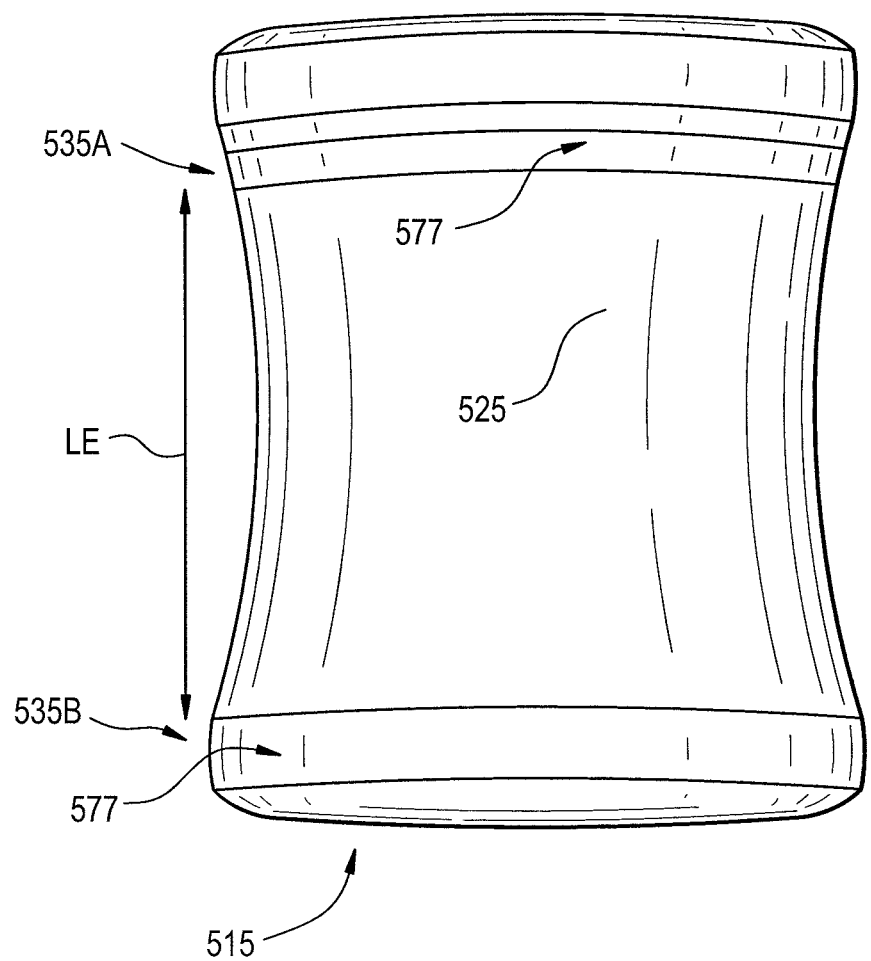
FIG. 8 is a photograph of a prior art hourglass shaped roller after testing.
Figure 12:
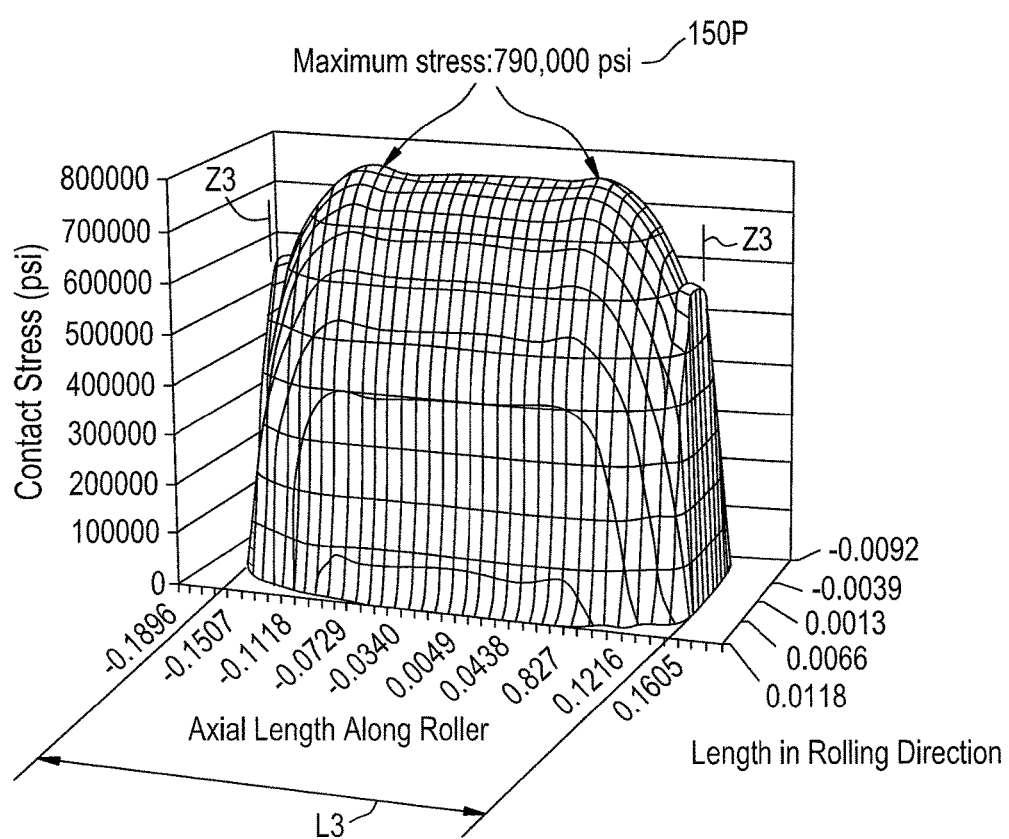
FIG. 12 is a three dimensional plot of surface stress versus axial length and circumferential length of the hourglass shaped roller of the present invention.

As shown in FIG. 12, the roller 115 has an improved stress profile compared to that shown in FIG. 3 for typical rollers 515. The stress profile for the roller 115 of FIG. 12 eliminates the peak "end stress" condition. For example, FIG. 12 illustrates that the peak stress 150P of the roller occurs inwardly of the third transition zone Z3. As a result of significant testing and analysis, the inventors have discovered that the roller 115 having the exterior surface 125E configured with the first radius of curvature R1 and the second radius of curvature R2 as described herein has resulted in the improved stress profile illustrated in FIG. 12.

Figure 14A:
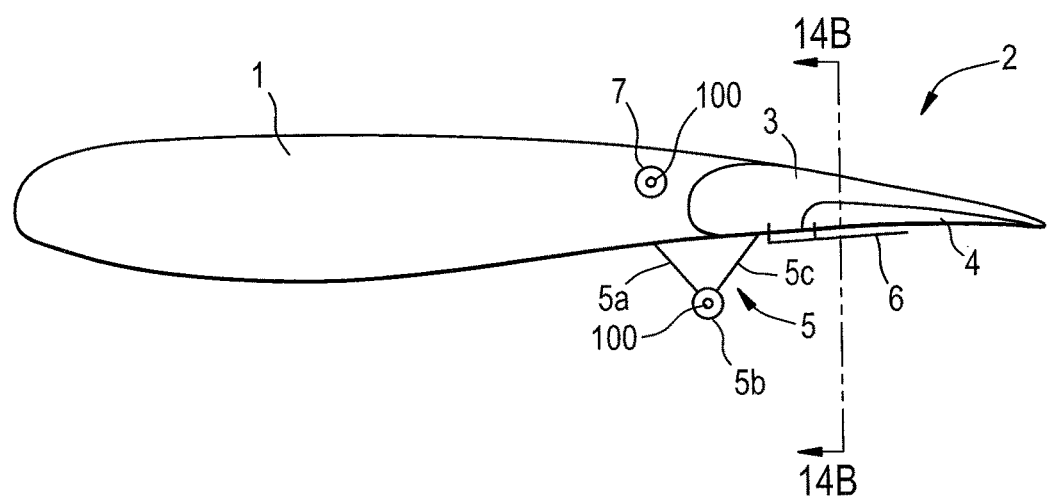
FIG. 14A illustrates schematically a cross section through an aircraft wing having a trailing edge flap arrangement in accordance with the invention shown in its retracted position.
Figure 14B:
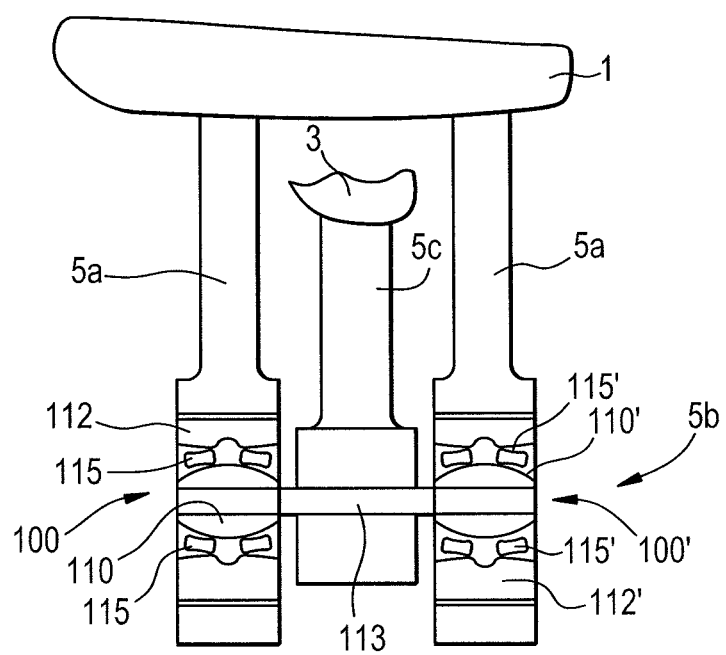
FIG. 14B is a partial front view of the aircraft wing having a trailing edge flap arrangement of FIG. 14A.

Referring to FIG. 14A, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement 5 includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 6 for translational movement relative to the main flap element 3. The hinge point 5b has one of the bearing assemblies 100 (as described herein with reference to FIGS. 9-13) mounted therein. While the hinge point 5b is described as having one of the bearing assemblies 100 therein, the present invention is not limited in this regard as any number of the bearing assemblies 100 (e.g., at least one of the bearing assemblies) may be employed in the hinge point 5b. In one embodiment, as shown in FIG. 14B, the hinge point 5b has two of the bearing assemblies 100, 100' installed therein; and in another embodiment, the hinge point 5b has two of the bearing assemblies 100 and 100' installed therein wherein the bearing assembly 100 is of a larger size than the bearing assembly 100'. A shaft 113 is positioned concentric with the hinge point 5b. The shaft 113 pivotally connects, via the bearing assembly 100 and 100', the drop link 5c and the fixed strut 5a. While the bearing assemblies 100 and 100' are shown and described as being of different sizes, the present invention is not limited in this regard as the bearing assemblies 100 and 100' may be of a common size.

Figure 14C:
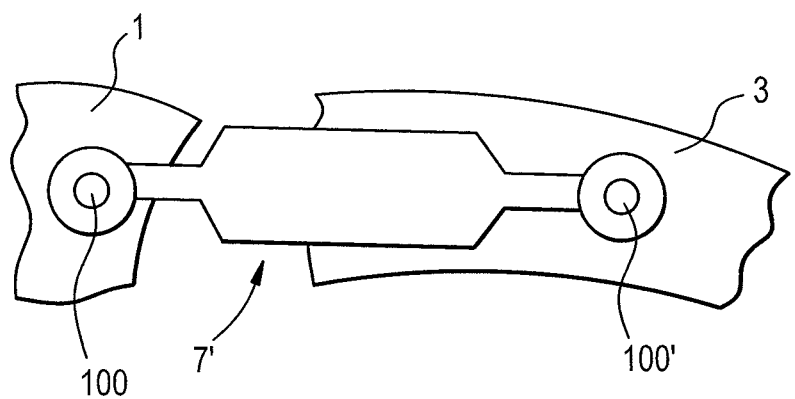
FIG. 14C is a schematic illustration of a linear actuator mounted on the aircraft wing having a trailing edge flap arrangement of FIG. 14A.

FIG. 14A shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the airfoil profile of the main flap element 3. The trailing edges of the main and auxiliary flap elements 3 and 4 are substantially coincident when the auxiliary flap element 4 is in its retracted, stowed position. As further shown in FIG. 14A, the main flap element 3 includes an actuator 7 (e.g., a linear or a rotary actuator), which is connected by a linkage arrangement (not shown) to the main flap element 3. In one embodiment, the actuator 7 has one of the bearing assemblies 100 (as described herein with reference to FIGS. 9-13) disposed therein. While the actuator 7 is described as having one of the bearing assemblies 100 therein, the present invention is not limited in this regard as any number of the bearings assemblies 100 may be employed in the actuator 7. For example, as shown in FIG. 14C two bearing assemblies 100 and 100' are employed in a linear actuator 7', wherein the bearing assembly 100 is secured to the fixed wing structure 1 and the bearing assembly 100' is secured to the main flap element 3. The actuator 7 or 7' provides for movement of the main flap element 3 relative to the fixed wing portion 1. In one embodiment, the actuator 7 provides for movement of the drop hinge linkage arrangement 5 which, in turn, provides for movement of the main flap element 3 relative to the fixed wing portion 1.

Figure 15:
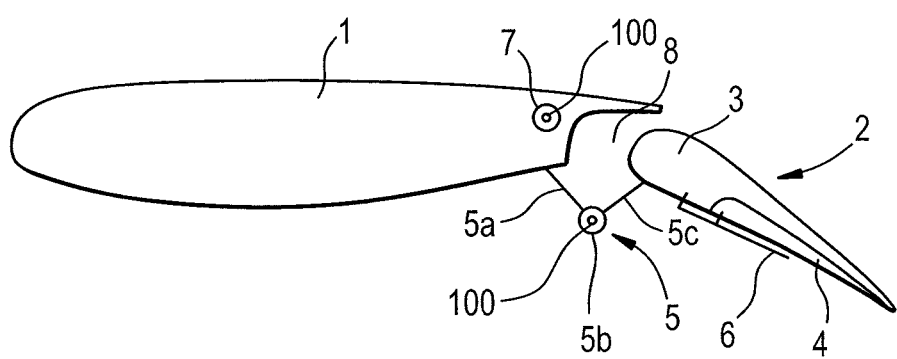
FIG. 15 illustrates the aircraft wing with the flap arrangement partially deployed.

FIG. 15 illustrates the flap arrangement 2 in its partially extended position. The main flap element 3 is deployed by rotating it downwardly using the drop hinge mechanism 5. Movement of the main flap element 3 is effected by the rotary actuator 7 and the bearing assemblies 100 installed therein. As can be seen from FIG. 15, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 15 enables high pressure air from the lower wing surface to pass through the slot 8 to energize the boundary layer over the upper surface of the main flap element 3 so as to postpone stall in a conventional manner. The single slotted trailing edge flap arrangement 2 is configured for use with an aircraft such as, for example, an Airbus A-350 aircraft.

In one embodiment, the hourglass bearing assembly 100 is installed in an edge flap arrangement 2 of an aircraft, for example, an Airbus A-350 aircraft. The hourglass bearing assembly 100 includes an inner raceway 110 defining a radially outwardly facing convex surface 120 having an inner raceway radius of curvature Ri. The hourglass bearing assembly 100 includes an outer raceway 112 defining a radially inward facing convex inner surface 122A, 122B each having an outer raceway radius of curvature Ro. The outer raceway 112 is positioned around the inner raceway 110. A plurality of rollers 115 is disposed between the inner raceway 110 and the outer raceway 112. Each of the plurality of rollers 115 has an hourglass shape and are in rolling engagement with the inner raceway 110 and the outer raceway 112. Each of the plurality of rollers 115 has a circular cross section symmetrical about a longitudinal axis and a first axial end 115A and a second axial end 115B. Each of the plurality of rollers 115 has an exterior surface 125 extending between the first axial 115A end and the second axial end 115B. The exterior surface 125 defines a concave engagement surface extending outwardly from a central portion of the roller. The concave engagement surface has a first radius of curvature R1 extending from the central portion to each of two first transition zones Z1 positioned on opposing sides of the central portion. The concave engagement surface has a second radius of curvature R2 extending outwardly from each of the two first transition zones Z1 to each of two second transition zones Z2. The second radius of curvature R2 is greater than the first radius of curvature R1. The first radius of curvature R1 is between 50 percent and 95 percent of the second radius of curvature R2. In one embodiment, the first radius of curvature R1 is between 70 percent and 92 percent of the second radius of curvature R2. The exterior surface 125 defines an extended area for engagement positioned between each of the second transition zones Z2 and each of two third transition zones Z3. The third transition zones Z3 are positioned outwardly from a respective one of the second transition zones Z2. A first distance L1 is defined between the two first transition zones Z1; a second distance L2 is defined between the two second transition zones Z2; a third distance L3 is defined between the two third transition zones Z3; and the first distance L1 has a magnitude between 40 percent and 60 percent of the third distance L3. In one embodiment, the first distance L1 has a magnitude between 48 percent and 51 percent of the third distance L3. The extended area for engagement defines an area of engagement with a rolling surface of a bearing race, the area of engagement engages the rolling surface when the roller and bearing race are in a loaded condition. A peak stress of the roller occurs inwardly from the two third transition zones.

Although the invention has been described with reference to particular embodiments thereof, it will be understood by one of ordinary skill in the art, upon a reading and understanding of the foregoing disclosure that numerous variations and alterations to the disclosed embodiments will fall within the spirit and scope of this invention and of the appended claims.

What is claimed is:

1. An hourglass bearing assembly installed in an edge flap arrangement of an aircraft, the hourglass bearing assembly comprising:
    an inner raceway defining a radially outwardly facing convex surface having an inner raceway radius of curvature Ri;
    an outer raceway defining a radially inward facing convex inner surface having an outer raceway radius of curvature Ro, the outer raceway being positioned around the inner raceway;
    a plurality of rollers disposed between the inner raceway and the outer raceway, each of the plurality of rollers having an hourglass shape and being in rolling engagement with the inner raceway and the outer raceway;
    each of the plurality of rollers having:
        a circular cross section symmetrical about a longitudinal axis;
        a first axial end and a second axial end;
        an exterior surface extending between the first axial end and the second axial end;
        the exterior surface defining a concave engagement surface extending outwardly from a central portion of the roller,
            the concave engagement surface having a first radius of curvature R1 extending from the central portion to each of two first transition zones Z1 positioned on opposing sides of the central portion and
            the concave engagement surface having a second radius of curvature R2 extending outwardly from each of the two first transition zones Z1 to each of two second transition zones Z2; and
        the second radius of curvature R2 is greater than the first radius of curvature R1; and
        the first radius of curvature R1 is between 50 percent and 95 percent of the second radius of curvature R2.

2. The hourglass bearing assembly of claim 1 wherein the aircraft is a commercial aircraft having a wingspan of about 60 meters or more.

3. The hourglass bearing assembly of claim 1, wherein the first radius of curvature R1 is between 70 percent and 92 percent of the second radius of curvature R2.

4. The hourglass bearing assembly of claim 1, wherein the exterior surface defines an extended area for engagement positioned between each of the second transition zones Z2 and each of two third transition zones Z3, the third transition zones Z3 being positioned outwardly from a respective one of the second transition zones Z2.

5. The hourglass bearing assembly of claim 4, wherein:
    a first distance L1 is defined between the two first transition zones Z1;
    a second distance L2 is defined between the two second transition zones Z2;
    a third distance L3 is defined between the two third transition zones Z3; and
    the first distance L1 having a magnitude between 40 percent and 60 percent of the third distance L3.

6. The hourglass bearing assembly of claim 4, wherein:
    a first distance L1 is defined between the two first transition zones Z1;
    a second distance L2 is defined between the two second transition zones Z2;
    a third distance L3 is defined between the two third transition zones Z3; and
    the first distance L1 having a magnitude between 48 percent and 51 percent of the third distance L3.

7. The hourglass bearing assembly of claim 4, wherein the extended area defines an area of engagement with a rolling surface of a bearing race, the area of engagement engages the rolling surface when the roller and bearing race are in a loaded condition.

8. The hourglass bearing assembly of claim 7, wherein a peak stress of the roller occurs inwardly from the two third transition zones.

* * * * *